(12) United States Patent
Roosma

(10) Patent No.: US 7,341,415 B2
(45) Date of Patent: Mar. 11, 2008

(54) BALE PROCESSING APPARATUS

(76) Inventor: Sam Roosma, 74 Samson Rd., Lonepine, MT (US) 59848

( * ) Notice: Subject to any disclaimer, the term of this patent is extended or adjusted under 35 U.S.C. 154(b) by 290 days.

(21) Appl. No.: 11/093,852

(22) Filed: Mar. 30, 2005

(65) Prior Publication Data

US 2005/0220572 A1 Oct. 6, 2005

Related U.S. Application Data

(60) Provisional application No. 60/558,679, filed on Apr. 1, 2004.

(51) Int. Cl.
A01D 90/08 (2006.01)

(52) U.S. Cl. .................. 414/24.6; 414/911; 198/813

(58) Field of Classification Search ........... 414/24.5, 414/24.6, 433; 198/813
See application file for complete search history.

(56) References Cited

U.S. PATENT DOCUMENTS

| | | | | |
|---|---|---|---|---|
| 1,361,302 A * | 12/1920 | Bowers | ................... | 198/861.3 |
| 2,285,475 A * | 6/1942 | Valusek | ................... | 414/592 |
| 4,078,733 A * | 3/1978 | Popiolek | ................... | 241/200 |
| 4,084,711 A | 4/1978 | Armstrong | ................... | 214/1 HH |
| 4,120,405 A | 10/1978 | Jones | ................... | 214/1 HH |
| 4,195,958 A * | 4/1980 | Vahlkamp et al. | ................... | 414/24.6 |
| 4,299,522 A | 11/1981 | Barton | ................... | 414/24.5 |
| 4,390,312 A * | 6/1983 | Skeem | ................... | 414/24.6 |
| 4,396,331 A * | 8/1983 | Forster | ................... | 414/24.6 |
| 4,411,573 A * | 10/1983 | Townsend | ................... | 414/24.6 |
| 5,067,870 A | 11/1991 | Staffanson | ................... | 414/724 |
| 5,067,871 A * | 11/1991 | Hilber | ................... | 414/807 |
| 5,211,345 A | 5/1993 | Siebenga | ................... | 251/101.7 |
| 5,253,970 A | 10/1993 | Bashaw, III | ................... | 414/24.6 |
| 5,311,840 A | 5/1994 | Rumbaugh | ................... | 119/60 |
| 5,358,370 A * | 10/1994 | Carpentier | ................... | 414/24.6 |
| 5,397,208 A | 3/1995 | Siebenga | ................... | 414/111 |
| 5,477,811 A | 12/1995 | Nobles et al. | ................... | 119/60 |
| 5,641,058 A * | 6/1997 | Merten et al. | ................... | 198/810.04 |
| D398,084 S | 9/1998 | Hartl | ................... | D30/121 |
| 5,833,424 A | 11/1998 | Bales | ................... | 414/24.5 |
| 6,006,696 A | 12/1999 | Mann et al. | ................... | 119/60 |
| 6,663,337 B2 * | 12/2003 | Westendorf et al. | ................... | 414/685 |

FOREIGN PATENT DOCUMENTS

GB 2048211 * 12/1980 ................ 414/24.6

* cited by examiner

*Primary Examiner*—James Keenan
(74) *Attorney, Agent, or Firm*—Shane P. Coleman; Holland & Hart LLP

(57) ABSTRACT

A bale processing apparatus and method is provided to lift, hold, transport, and spread one or more round bales of hay or other material. The apparatus includes a belt, rollers, and a means for controlling tension on the belt to position the belt in first and second positions. In the first position the belt forms a cradle between the first and second rollers capable to hold a bale. In the second position the belt may eject the bale. The bale is lifted onto the belt, with the belt in the cradle position, is untied, and the belt is turned to unroll the bale. The apparatus may be connected to a vehicle that moves while the belt turns to feed the bale over an area. The bale is ejected from the belt by adjusting the tension on the belt to the eject position and moving the belt.

18 Claims, 15 Drawing Sheets

BALE PROCESSING APPARATUS

PRIORITY CLAIM

This application claims the benefit of U.S. patent application Ser. No. 60/558,679, filed Apr. 1, 2004, entitled "Bale Processing Apparatus," which is incorporated by this reference as though fully set forth herein.

FIELD OF INVENTION

The present invention relates to farm machinery. More particularly, the present invention relates to an apparatus for feeding hay or other baled product to animals.

BACKGROUND

In the field of animal husbandry, hay is often used as a feed for livestock. Hay is often wound together in a square or cylindrical bale. To feed the bale to animals, the bale is normally taken apart by cutting twine or other material used to bind the bale. Preferably, the unwound bale then has its hay spread throughout a desired feeding area.

Unwinding round bales is particularly difficult and dangerous. A round hay bale can weigh several hundred pounds. It is difficult, therefore, to maneuver the bale. Because it is difficult to maneuver the bale, it is difficult to spread the hay throughout a desired area to feed multiple animals. Instead, the hay often sits in a single pile or must be manually moved in small portions.

SUMMARY OF THE INVENTION

There exists a need to provide an improved method and apparatus for processing bales which overcomes at least some of the above-referenced deficiencies. Accordingly, at least this and other needs have been addressed by exemplary embodiments of the bale processing apparatus according to the present invention. One such embodiment is directed to a bale processing apparatus. The apparatus includes a belt and first and second rollers positioned proximate the belt. The apparatus further includes means for controlling tension on the belt to position the belt in a first position in which the belt forms a cradle between the first and second rollers capable of holding a round bale and a second position in which the belt may eject the bale.

In another exemplary embodiment of the present invention, a method of processing a bale is provided. A bale is engaged, for example, by a bale lifting portion of an apparatus, such as a lifting portion including a bale spear. The bale is positioned on a belt, for example, by activating the lifting portion. Tension on the belt is controlled to selectively position the belt in either a cradle position in which the bale may be rotated in response to movement of the belt and or an eject position in which the bale may be ejected in response to movement of the belt. The belt is moved while the bale is positioned on the belt to eject at least a portion of the bale to be ejected from the belt.

In yet another exemplary embodiment of the present invention, a bale processing apparatus is provided. The apparatus includes means for engaging a bale, means for holding the bale, means for lifting the bale to the means for holding, and means for unwinding the bale while the bale is positioned in the means for holding.

BRIEF DESCRIPTION OF DRAWINGS

The detailed description will refer to the following drawings, wherein like numerals refer to like elements, and wherein.

DETAILED DESCRIPTION

Figure 1:
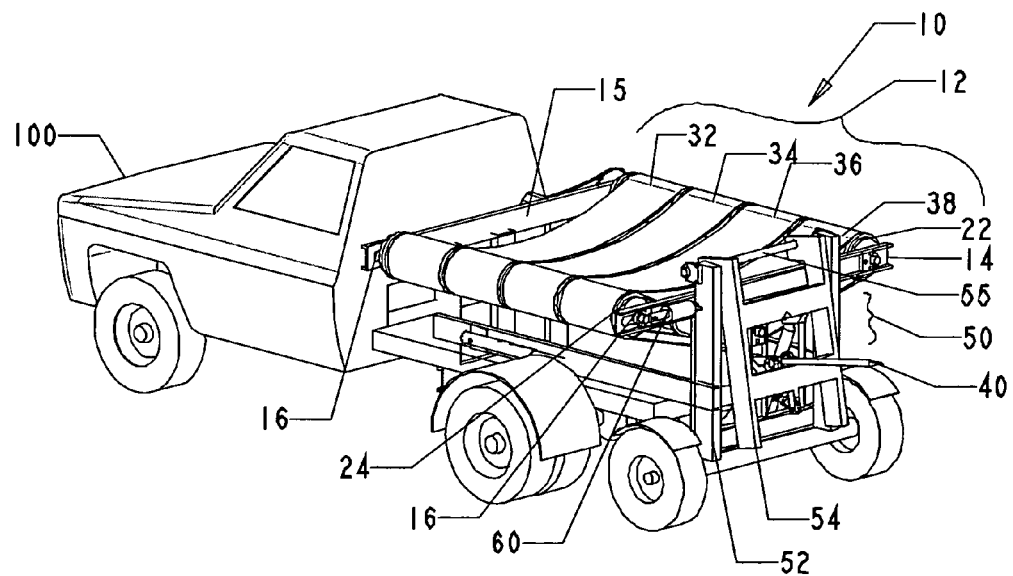
FIG. 1 shows a perspective view of one exemplary embodiment of a bale processing apparatus attached to a vehicle.

FIG. 1 shows a perspective view of one exemplary embodiment of a bale processing apparatus 10 attached to a vehicle 100. The apparatus 10 includes a cradle portion 12 and a lift portion 50. The cradle portion 12 includes first and second rollers 22, 24. Belts 32, 34, 36, 38 pass over the rollers 22, 24 and also pass around a third roller (not shown).

The first and second rollers 22, 24 are connected at ends to first and second frame members 14, 15. The first roller 22 is connected to the frame members 14, 15 at a fixed position. The second roller 24 is connected to the frame members 14, 15 at an adjustable position within a slot 16 defined in the frame members 14, 15. An actuator 60 moves the second roller 24 relative to the frame members 14, 15 within the slot 16, thereby tightening or loosening tension on the belts 32, 34, 36, 38 (a "tightened position" or a "loosened position"). In other embodiments, various other means may be used to change tension on the belts 32, 34, 36, 38 without moving the rollers 22, 24, such as, for example, adding a separate roller for the exclusive purpose of changing tension, or adding any other sort of clutch-type device that engages the belts 32, 34, 36, 38.

The lift portion 50 includes frame portions 52, 54 pivotally connected to each other at a hinge member 55. Frame portion 54 moves relative to frame portion 52 about the hinge member 55 in response to movement by an actuator (not shown) to lift a hay bale (not shown) into the cradle portion 12. A lift portion 50 further includes means for engaging a bale. In the embodiment of FIG. 1, the bale engaging means is a spear 40 that pierces the bale at or near a center portion of the bale.

In use, a bale is engaged by the spear 40. The actuator (not shown) then causes the frame portion 54 to move relative to frame portion 52 at the hinge member 55, thereby lifting the bale. The bale is raised by the lift portion 50 until the bale's weight causes it to disengage the spear 40 and fall into the cradle portion 12. Once the bale is in the cradle portion 12, the user removes any twine, cellophane, or other baling material to allow the bale to come apart. A motor (not shown) then causes the belts 32, 34, 36, 38 to move. With the rollers 22, 24 in the loosened position, the bale rotates within the cradle portion 12 in response to movement of the belts 32, 34, 36, 38 without falling out of the apparatus 10. As the bale rotates, the hay unwinds from the bale and discharges from the side of the apparatus 10. The user may cause the bale to unwind while driving the vehicle 100, thereby spreading the hay across a desired area. If the user wants to discharge a full or partially-unwound bale, the user may cause the actuator 60 to move the rollers 22, 24 to the tightened position, thereby tightening the belts 32, 34, 36, 38. With the rollers 22, 24 in the tightened position, the user may cause the belts 32, 34, 36, 38 to move, thereby discharging the bale.

Figure 2:
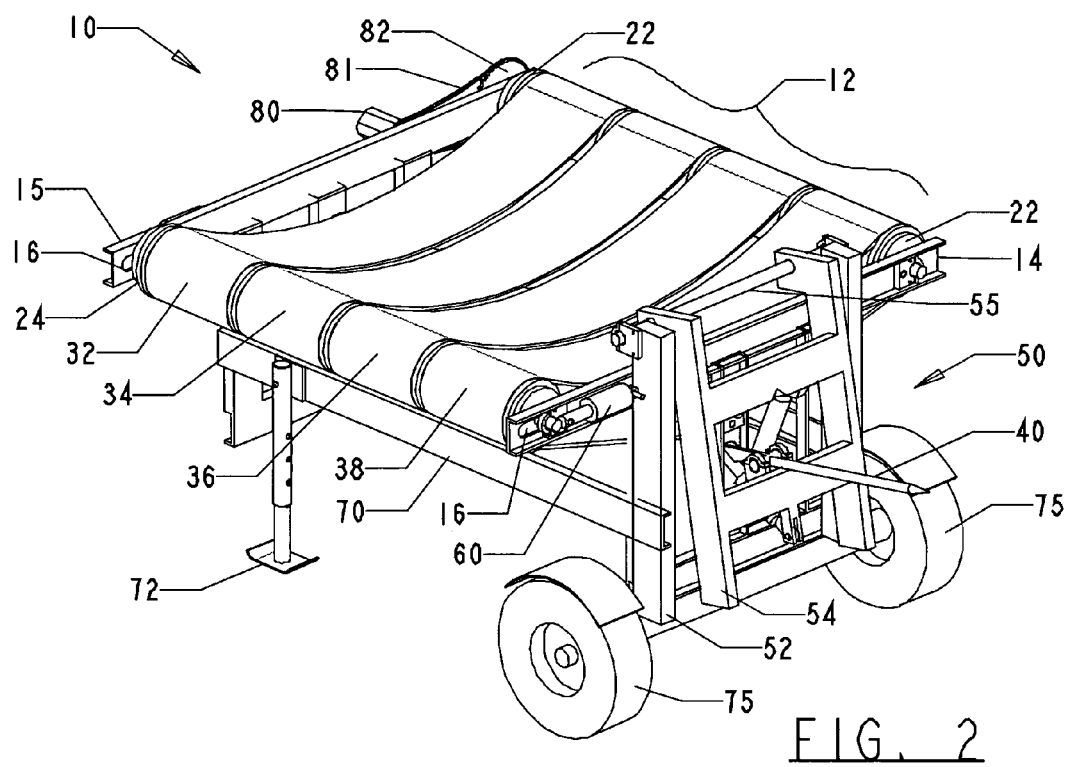
FIG. 2 shows a more detailed perspective view of the bale processing apparatus shown in FIG. 1.

FIG. 2 shows a more detailed perspective view of the bale processing apparatus 10 shown in FIG. 1. The embodiment of FIGS. 1 and 2 is designed to removeably connect to a common flatbed or pickup truck. The apparatus 10 includes wheels 75 and jacks 72 to support the apparatus 10 when the apparatus is not connected to a vehicle (e.g., 100 in FIG. 1). Horizontal frame members 70 connect to the jacks 72 and to frame portion 52 of the lifting portion 50. The roller 22 is connected to a motor 80 by a gear 82 and a drive belt 81. The motor 80 causes the roller 22 to move, thereby moving the belts 32, 34, 36, 38.

Figure 3:
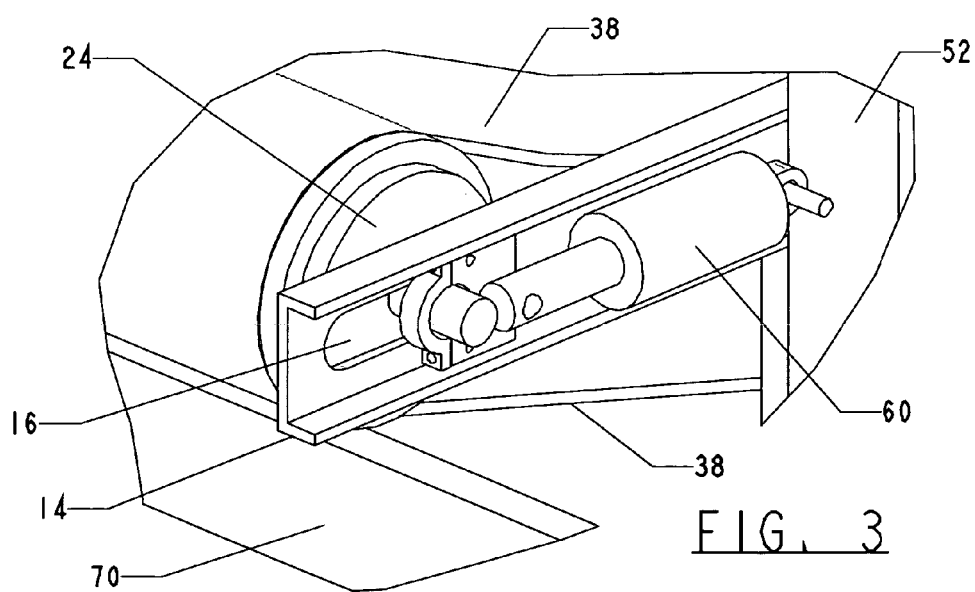
FIG. 3 shows a more detailed perspective view of the actuator shown in FIGS. 1 and 2.

FIG. 3 shows a more detailed perspective view of the actuator 60 shown in FIGS. 1 and 2. The actuator 60 is connected at one end to frame member 14 and at another end to the second roller 24. The actuator 60 causes the roller 24 to move within the slot 16 between a tightened and loosened position. In the embodiment of FIG. 3, the roller 24 is in the loosened position. In one embodiment, a second actuator (not shown) is connected to the opposing end of the roller 24 and to the frame member 15.

Figure 4:
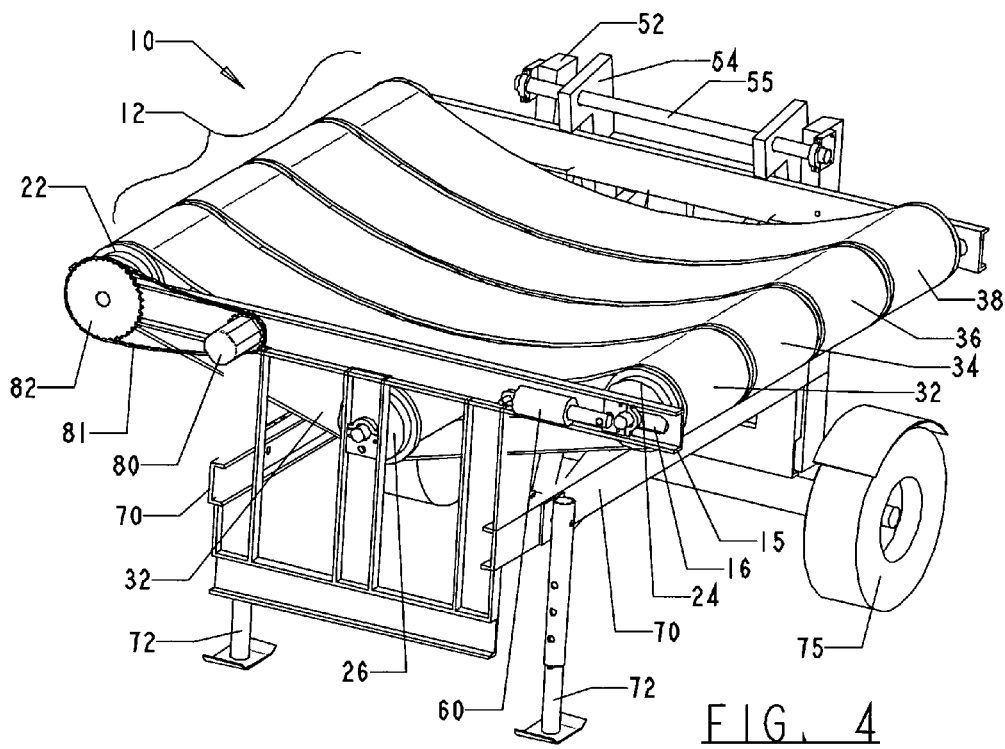
FIG. 4 shows another perspective view of the apparatus shown in FIGS. 1 and 2.

FIG. 4 shows another perspective view of the apparatus 10 shown in FIGS. 1 and 2. A second actuator 60 is connected to the end of the roller 24 and to frame member 15. FIG. 4 illustrates the third roller 26 positioned between the first and second rollers 22, 24 at a generally lower position in this embodiment. The belts 32, 34, 36, 38 pass around all three rollers 22, 24, 26.

Figure 5:
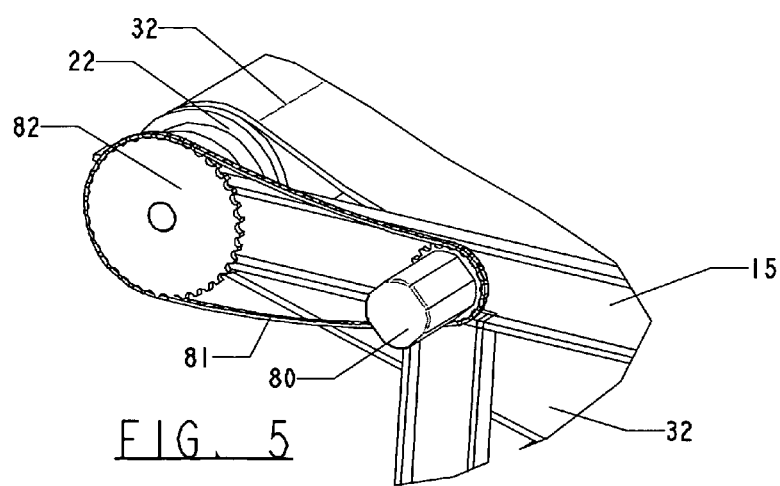
FIG. 5 shows a more detailed view of the motor assembly shown in FIG. 4.
Figure 6:
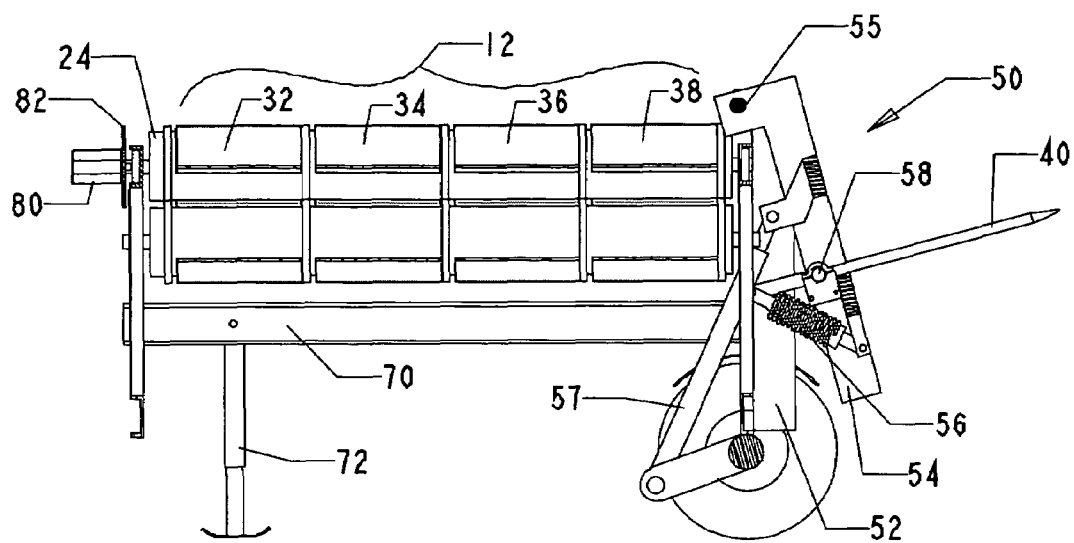
FIG. 6 shows a plan view of the apparatus with the lift portion in a lowered position at which the lift portion has begun to raise (without a bale)
Figure 7:
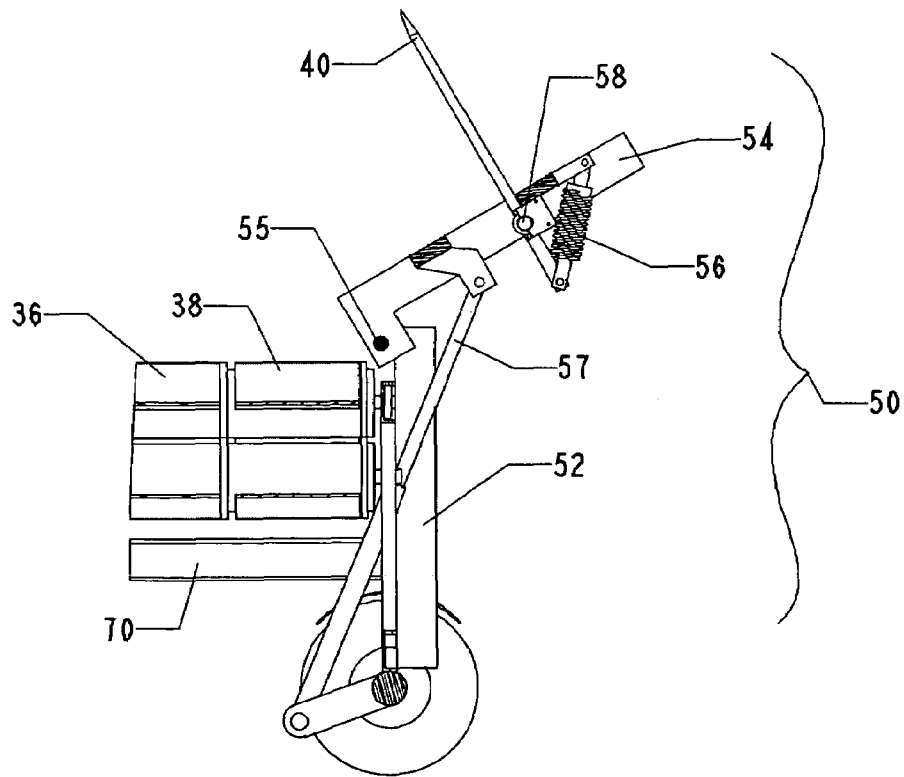
FIG. 7 shows another plan view of the apparatus shown in FIG. 6 with the lift portion in a partially raised position.
Figure 8:
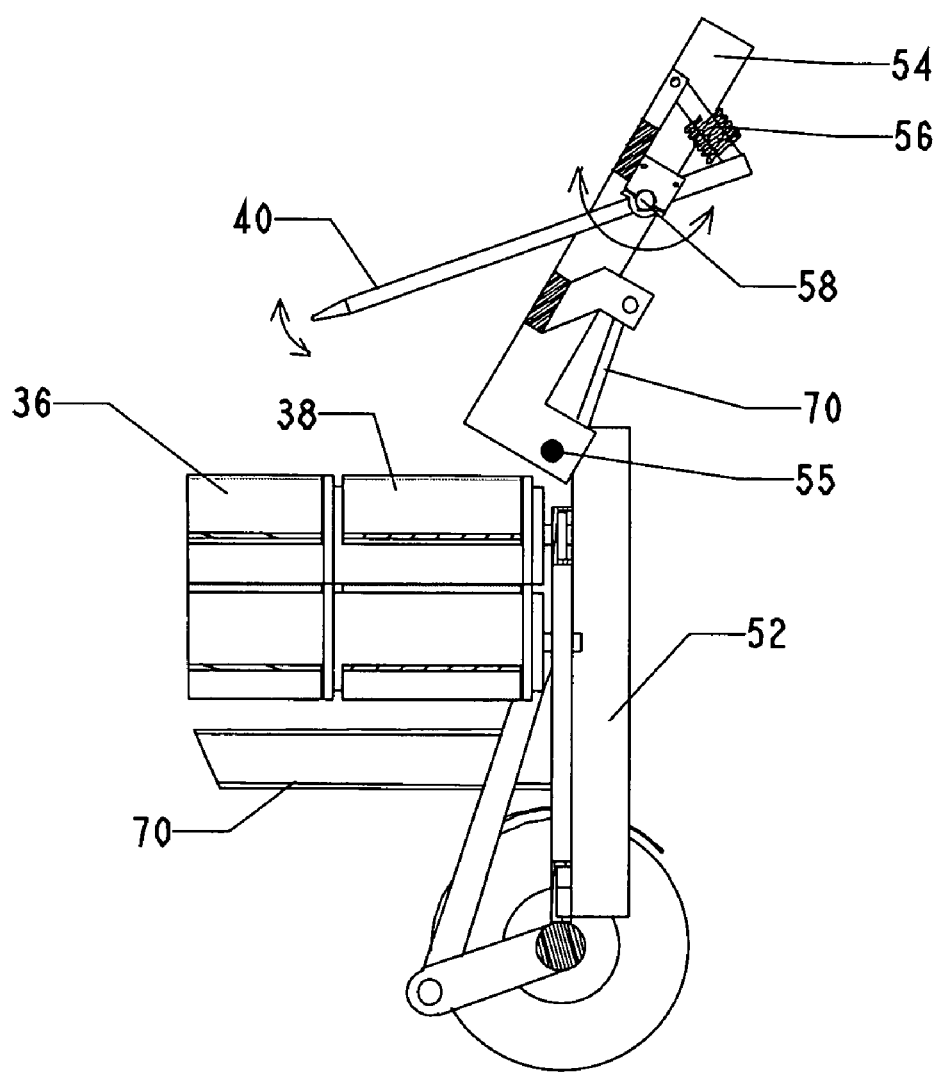
FIG. 8 shows another plan view of the apparatus shown in FIGS. 6 and 7 with lift portion raised farther than in FIGS. 6 and 7.

FIG. 5 shows a more detailed view of the motor assembly shown in FIG. 4. A gear 82 is connected to the first roller 22. The gear 82 is driven by a drive belt 81 connected to the motor 80. In one embodiment, the motor 80 can move the belts 32, 34, 36, 38 in either direction FIGS. 6-8 show operation of the lift portion 50 of the apparatus 10. FIG. 6 shows a plan view of the apparatus 10 with the lift portion 50 in a lowered position at which the lift portion 50 has begun to raise (without a bale). In use, the lift portion 50 lifts a bale on the spear 40 to position the bale in the cradle portion 12 of the apparatus 10. Actuator 57 connects between the frame portions 52, 54 to cause movement therebetween about the hinged member 55. Actuator 57 may be controlled, for example, hydraulically or electrically. The spear 40 is connected to the frame portion 54 at a pivotal connection 58 that allows limited movement in a plane generally perpendicular to the cradle portion 12 of the apparatus 10. In the embodiment of FIG. 6, that is the plane of the drawing sheet. Spring assembly 56 urges the spear 40 into the position shown in FIGS. 6 and 7 in which the spear 40 is generally normal to the frame portion 54.

FIG. 7 shows another plan view of the apparatus 10 shown in FIG. 6 with the lift portion 50 in a partially raised position. Actuator 57 has extended, thereby causing frame portion 54 to rotate upward, about the hinge connection 55 relative to the frame portion 52. Spear 40 remains generally normal to frame portion 54 in the position shown in FIG. 7. The angle of the lift portion 50 in FIG. 7 is not yet great enough, in this embodiment, to cause the bale to release from the spear 40.

FIG. 8 shows another plan view of the apparatus 10 shown in FIGS. 6 and 7 with lift portion 50 raised farther than in FIGS. 6 and 7. In the embodiment of FIG. 8, the lift portion 50 has raised to a point at which a bale (not shown) has begun to disengage the spear 40. The weight of the bale causes the bale to fall from the lift portion 50 into the cradle portion 12, thereby causing the spear 40 to pivot about the pivotal connection 58 to release the bale from the spear 40. Once the bale is released from the spear 40, the spring assembly 56 will cause the spear 40 to return to its original position, shown in FIGS. 6 and 7.

Figure 9:
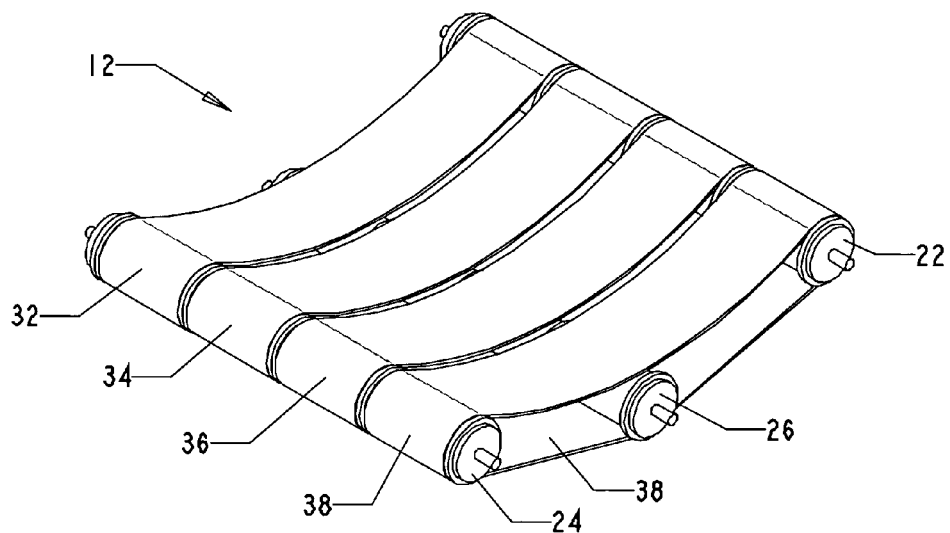
FIG. 9 shows an exemplary embodiment of the cradle portion of the apparatus, shown in FIG. 1.

FIG. 9 shows an exemplary embodiment of the cradle portion 12 of the apparatus 10, shown in FIG. 1. Belts 32, 34, 36, 38 pass around rollers 22, 24, 26. In the embodiment of FIG. 9, the belts 32, 34, 36, 38 are shown in the loosened position ready to receive and/or hold a bale.

Figure 10:
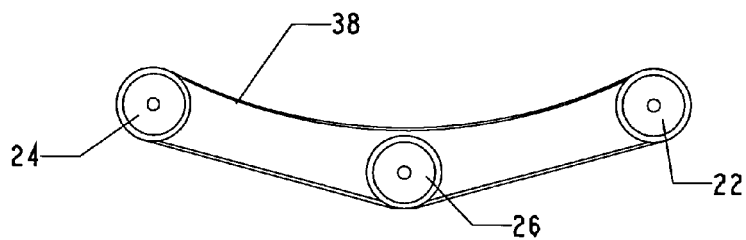
FIG. 10 shows an end view of the embodiment of the cradle portion shown in FIG. 9.

FIG. 10 shows an end view of the embodiment of the cradle portion 12 shown in FIG. 9. In the embodiment of 10, the belts 32, 34, 36, 38 are in the loosened position. As shown by belt 38, the belts 32, 34, 36, 38 sag to receive a bale in the cradle portion 12.

Figure 11:
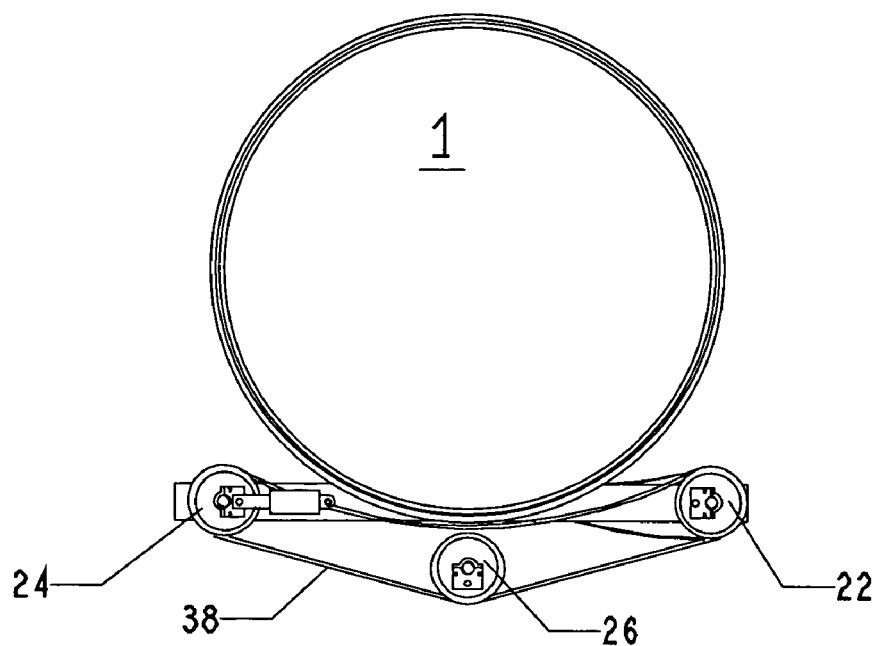
FIG. 11 shows an end view of the cradle portion with a bale positioned thereon.

FIG. 11 shows an end view of the cradle portion 12 with a bale 1 positioned thereon. Because the belts 32, 34, 36, 38 are generally loosened, the bale 1 rests on the belts 32, 34, 36, 38 without falling off of the apparatus 10 as the apparatus 10 (or the vehicle (e.g., 100 in FIG. 1) to which it is attached) moves.

Figure 12:
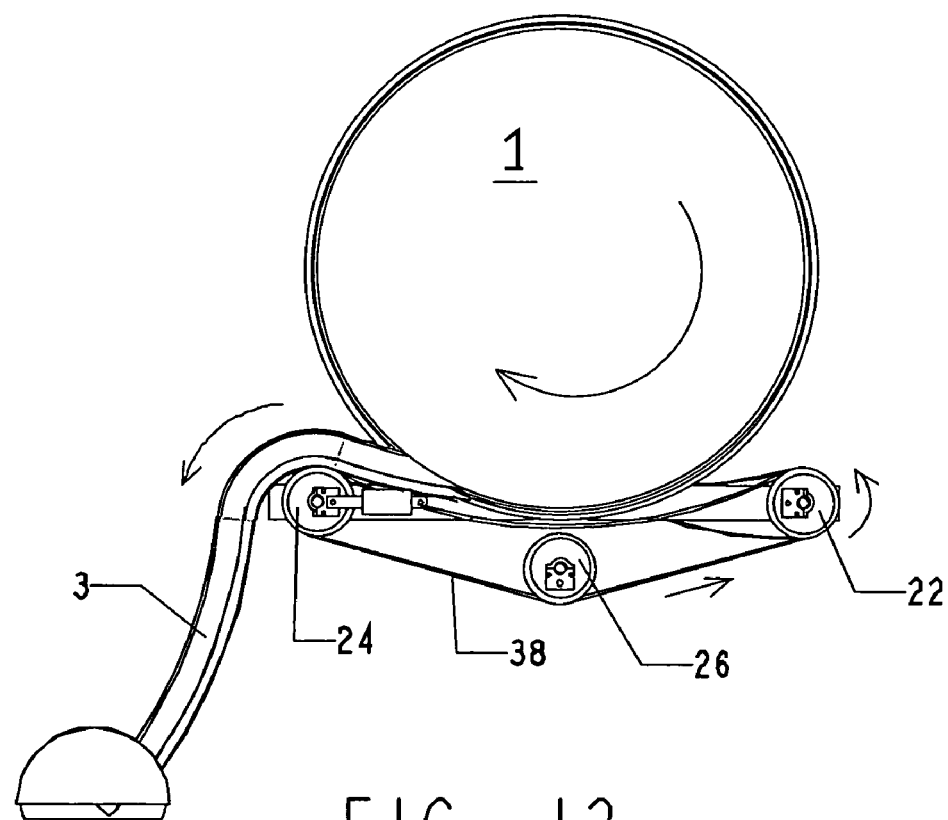
FIG. 12 shows an end view of the cradle portion shown in FIG. 11, in which the belts are moving to unroll the bale.

FIG. 12 shows an end view of the cradle portion 12 shown in FIG. 11, in which the belts 32, 34, 36, 38 are moving to unroll the bale 1. As the belts 32, 34, 36, 38 turn, the bale 1 remains in the cradle portion 12 but hay from the bale 1 feeds out of the apparatus 10.

Figure 13:
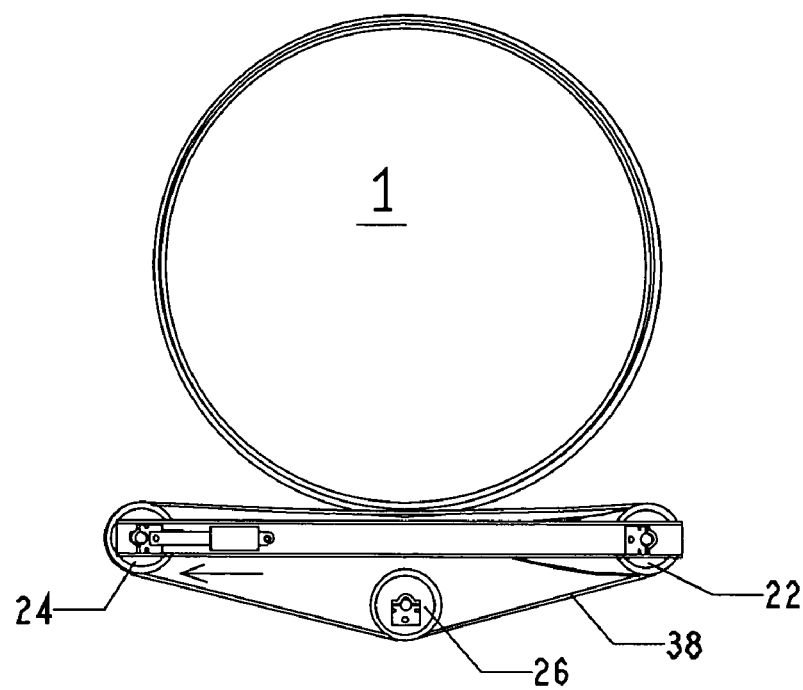
FIG. 13 shows an end view of the cradle portion of the apparatus with the belts in a tightened position.

FIG. 13 shows an end view of the cradle portion 12 of the apparatus 10 with the belts 32, 34, 36, 38 in a tightened position. In comparison to FIG. 11, the upper portion of the belts 32, 34, 36, 38 (on which the bale 1 is positioned) is generally flatter than in the loosened position. The belts 32, 34, 36, 38 may be tightened for example, to move a bale 1 or a partial bale off of the apparatus 10.

Figure 14:
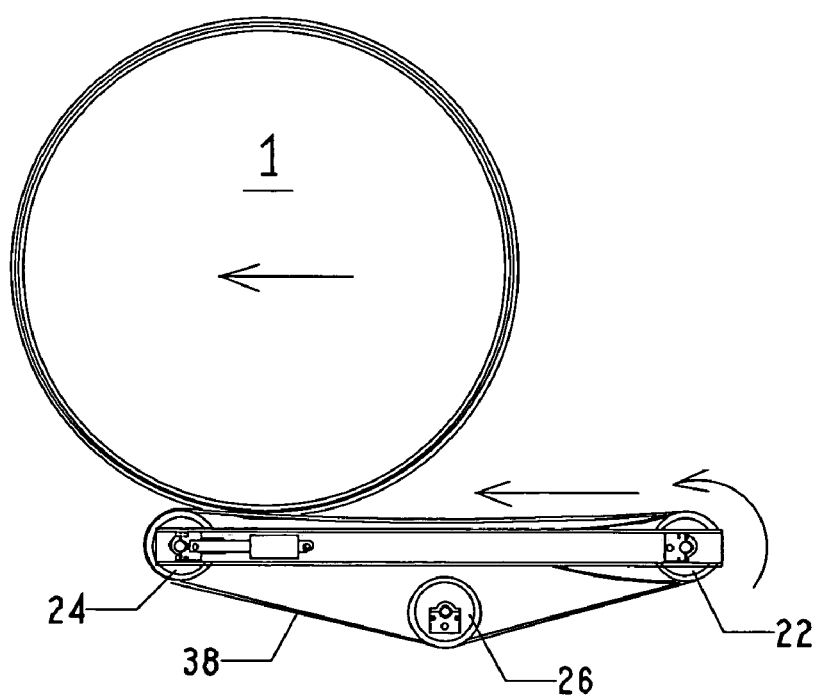
FIG. 14 shows an end view of the cradle portion shown in FIG. 13 in which the belts are moving.

FIG. 14 shows an end view of the cradle portion 12 shown in FIG. 13 in which the belts 32, 34, 36, 38 are moving. Because the belts 32, 34, 36, 38 are in a tightened position, the bale 1 is free to move laterally in response to movement of the belts 32, 34, 36, 38, off of the apparatus 10.

Figure 15C:
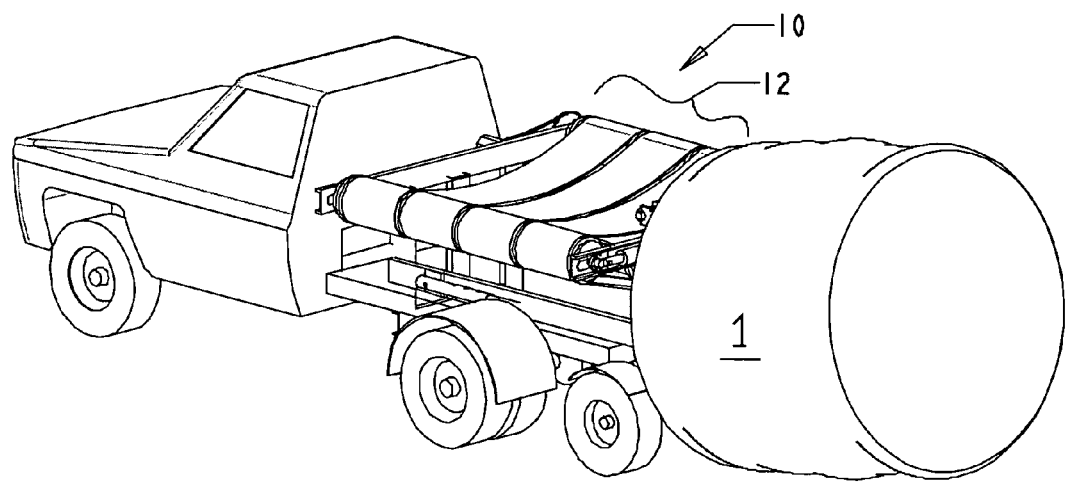
FIG. 15A-E show views of an exemplary embodiment of the bale processing apparatus of the present invention, in use with a bale.
Figure 15A:
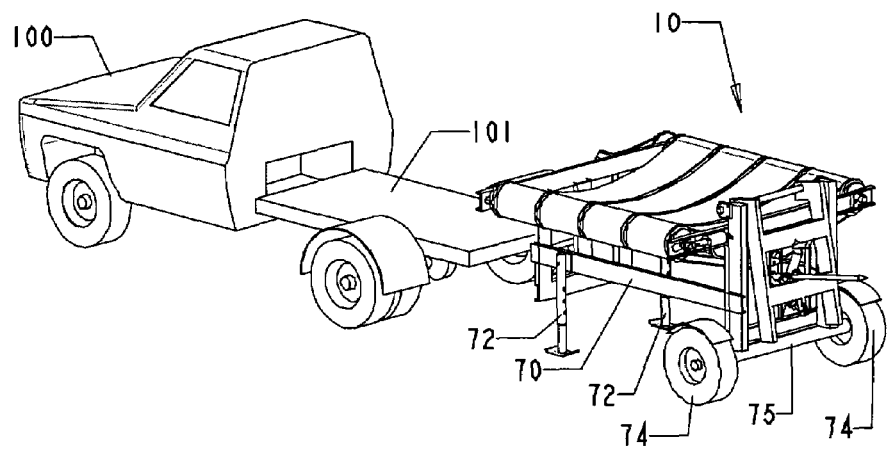
Figure 15B:
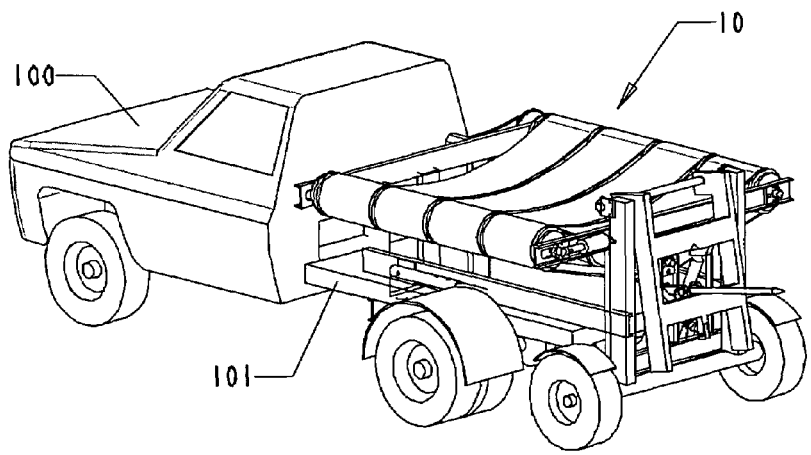
Figure 15D:
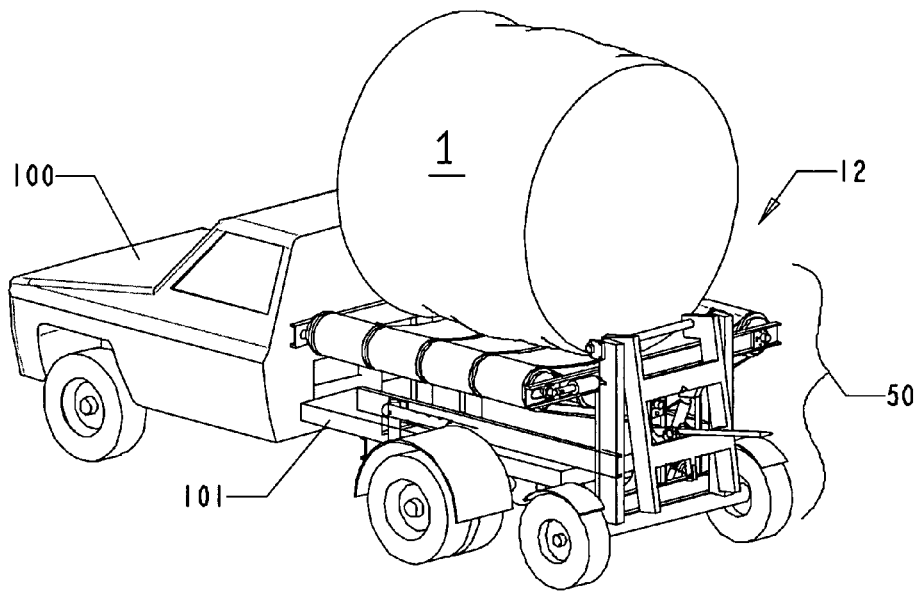
Figure 15E:
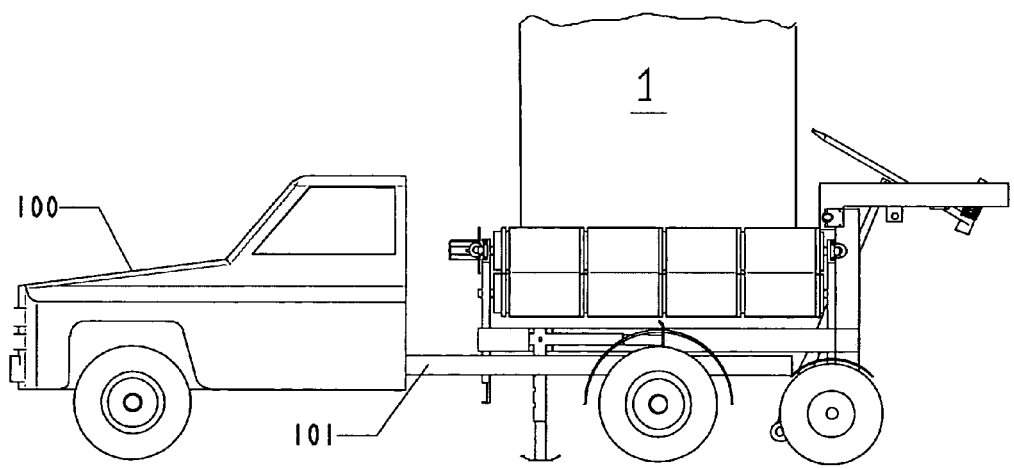

FIG. 15A-E show views of an exemplary embodiment of the bale processing apparatus 10 of the present invention, in use with a bale 1. FIG. 15A shows a perspective view of the apparatus 10 as it is positioned on a flatbed 101 of a vehicle 100, such as a truck. The vehicle 100 backs up toward the apparatus 10 to engage the apparatus 10 and to connect the vehicle 100 to the apparatus 10. As shown in FIG. 15B, the jacks 72 are raised, and the apparatus 10 is attached to the vehicle 100. FIG. 15C shows a perspective view of the apparatus 10 engaging a bale 1 with the spear 40 and lifting the bale 1 from the ground so that the bale 1 can be transported on the spear 40 or in the cradle portion 12. FIG. 15D shows a perspective view of the apparatus once the bale 1 has been positioned in the cradle portion 12. FIG. 15E shows a side view of the apparatus 10 with the bale 1 in the cradle portion 12.

Figure 16:
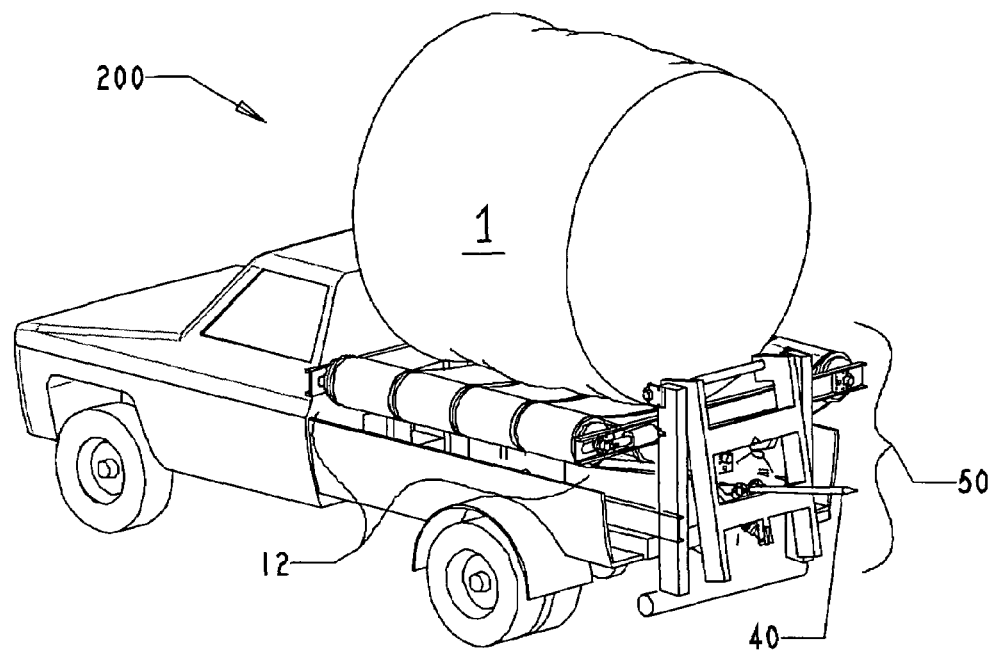
FIG. 16 shows an alternative embodiment of a bale processing apparatus in which the apparatus includes a motor vehicle.

FIG. 16 shows an alternative embodiment of a bale processing apparatus 200 in which the apparatus 200 includes a motor vehicle. The cradle portion 12 may be permanently attached to the vehicle or may be removable.

Figure 17:
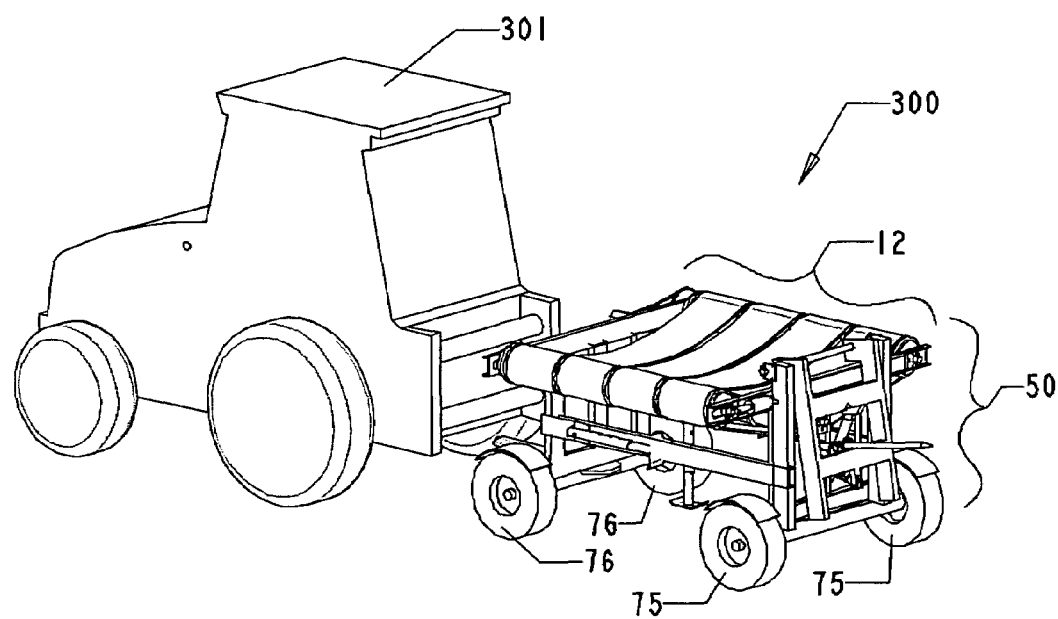
FIG. 17 shows another embodiment of a bale processing apparatus that includes two sets of wheels and is attached to a hitch of a tractor, truck, or other vehicle.

FIG. 17 shows another embodiment of a bale processing apparatus 300 that includes two sets of wheels 75, 76 and is attached to a hitch of a tractor, truck, or other vehicle.

Figure 18:
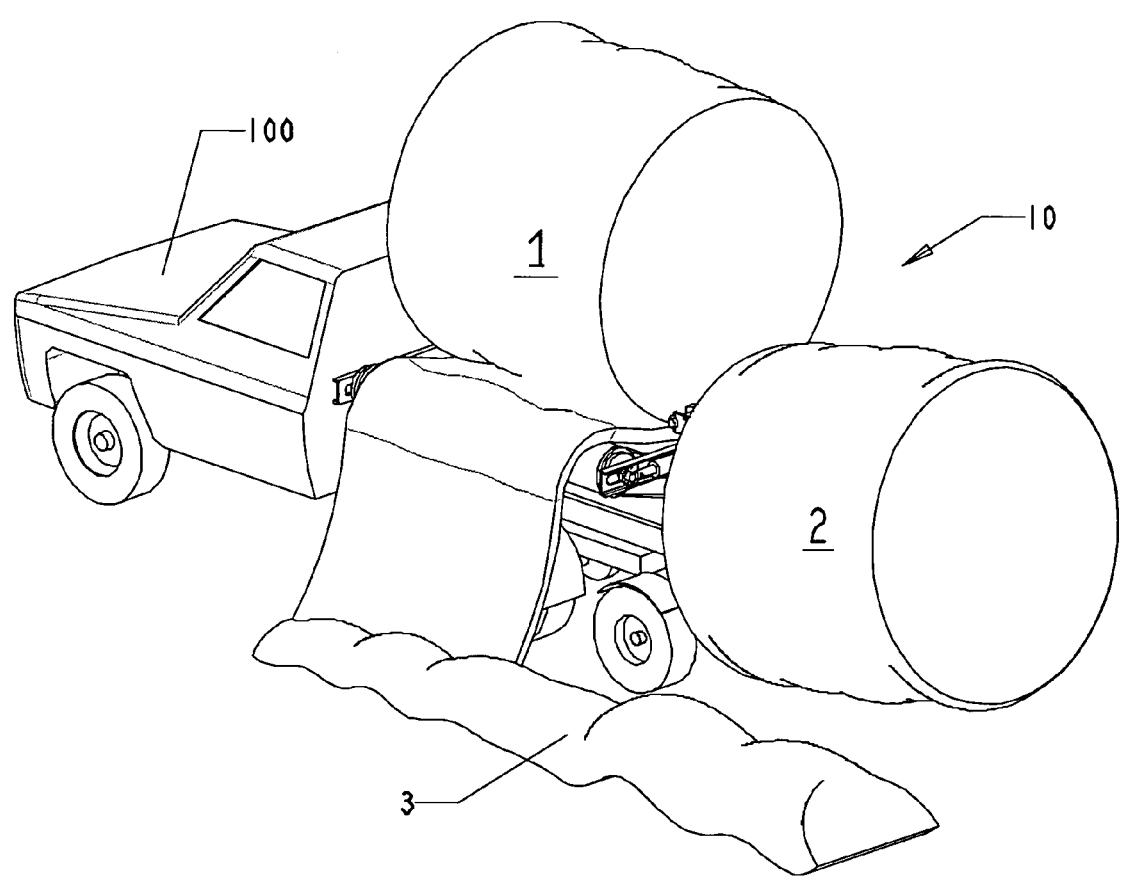
FIG. 18 shows a perspective view of the apparatus of FIG. 1 in which two bales are positioned on the apparatus.

FIG. 18 shows a perspective view of the apparatus of FIG. 1 in which two bales 1, 2 are positioned on the apparatus 10. In the embodiment shown, the apparatus is designed to hold a first bale 1 in the cradle portion 12 and a second bale 2 on the spear 40. In this manner, two bales 1, 2 may be unwound one after another, without picking up another bale. In the embodiment shown, the first bale 1 is being unwound, while the second bale 2 is positioned on the spear 40. When the first bale 1 is completely unwound, the second bale 2 may be moved to the cradle portion 12, and then the second bale 2 may be unwound.

Figure 19:
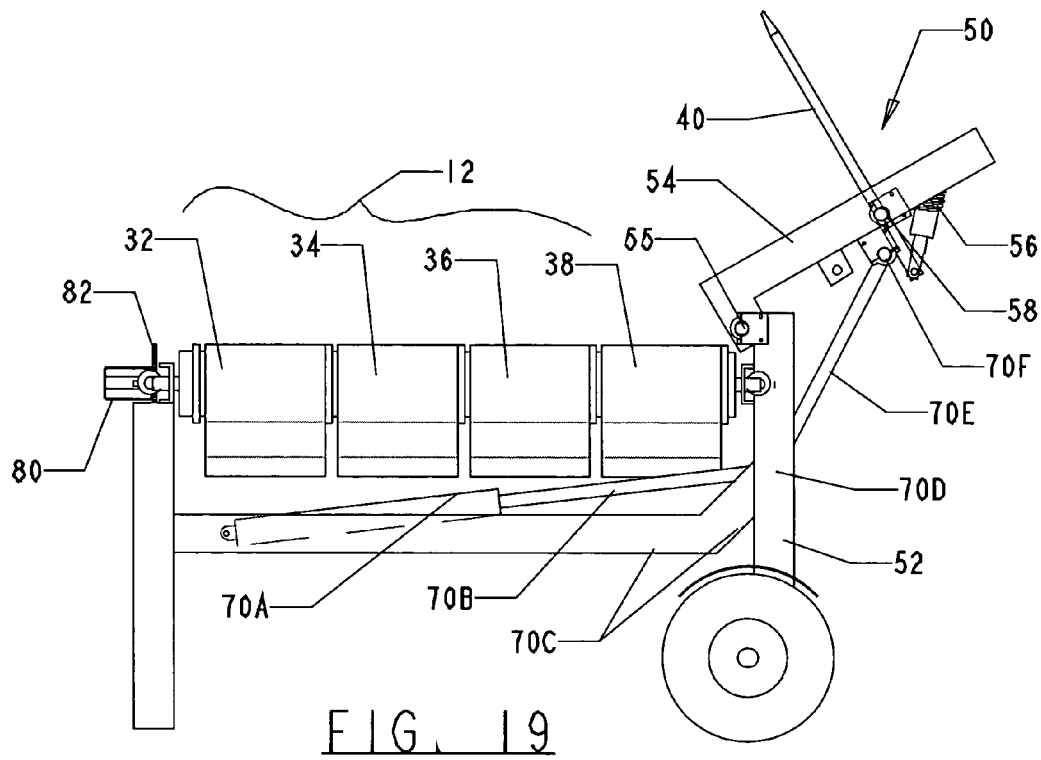
FIG. 19 shows a side view of another exemplary embodiment of the present invention.

FIG. 19 shows a side view of another exemplary embodiment of the present invention. The lift portion 50 is actuated by one or more cylinders 70A mounted to the frame below the belts 32, 34, 36, 38. The cylinder 70A has an extended portion 70B that pushes a cross-member 70D (see also FIG. 20) that is, in turn, connected to a bar 70E that connects to the lift portion 50 at a pivot point 70F. The cross-member 70D engages a track 70C running underneath the belts 32, 34, 36, 38. The cylinder 70A extends to raise the lift portion 50 and retracts to lower the lift portion 55. The track 70C guides cross-member 70D as the cylinder 70A extends and retracts. The track 70C angles upward toward the end, to allow the lift portion 50 to be further raised. In the example of FIG. 19, the lift portion 50 is shown in a raised position.

Figure 20:
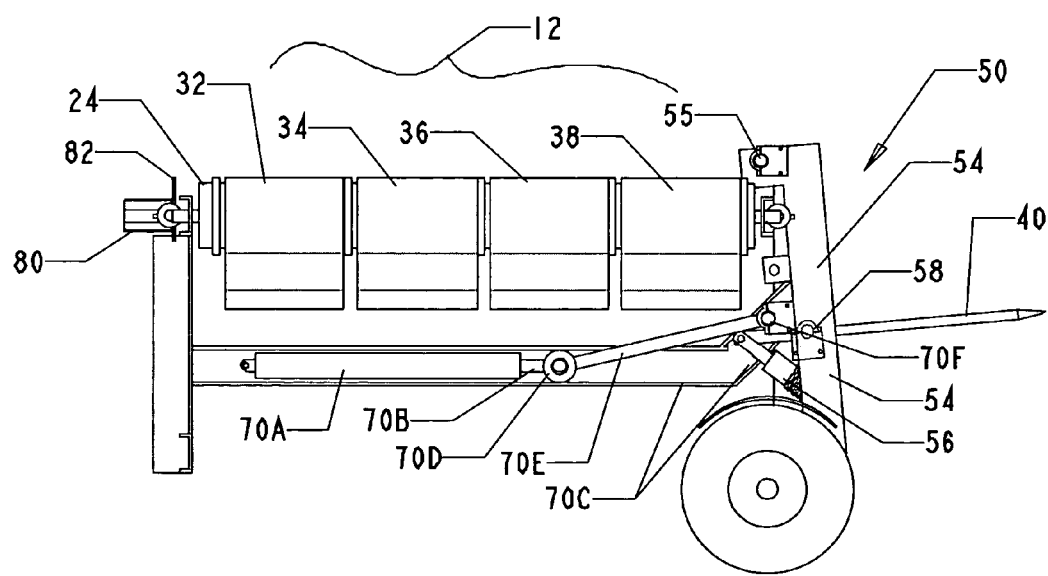
FIG. 20 shows another side view of the embodiment shown in FIG. 19.

FIG. 20 shows another side view of the embodiment shown in FIG. 19. FIG. 20 shows a cut-away view of the track 70C, with the lift portion 50 in a lowered position. In this example, the cross-member 70D is located further toward the cylinder 70A, within the track 70C.

Figure 21:
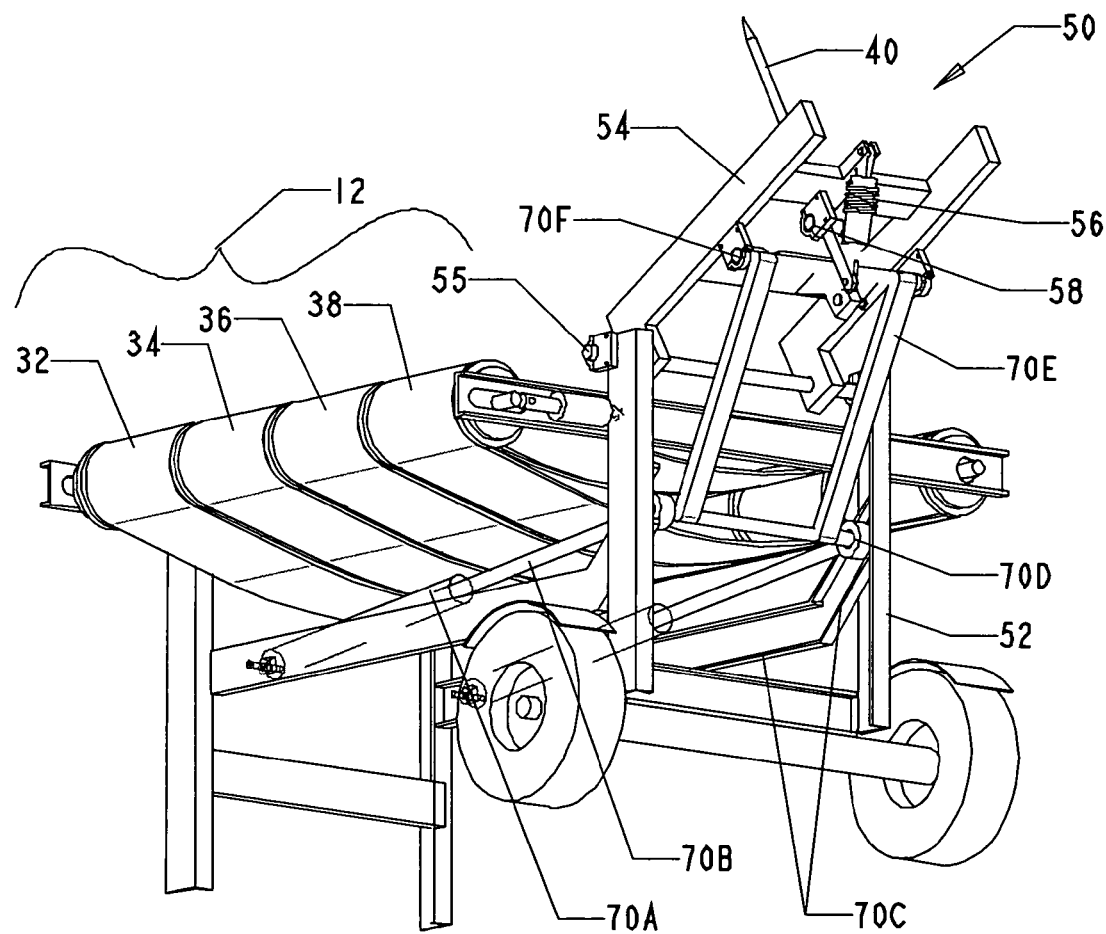
FIG. 21 shows a perspective view of the embodiment shown in FIGS. 19 and 20, in which the apparatus includes two cylinders positioned underneath the belts.

FIG. 21 shows a perspective view of the embodiment shown in FIGS. 19 and 20, in which the apparatus 10 includes two cylinders 70A positioned underneath the belts 32, 34, 36, 38.

Figure 22:
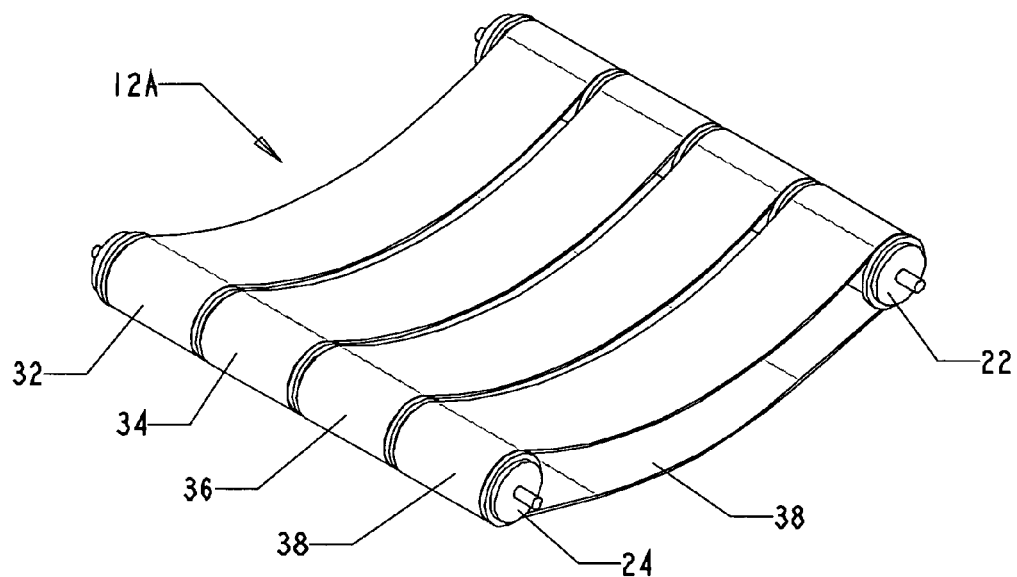
FIG. 22 shows a perspective view of another embodiment of a cradle portion having two rollers.

FIG. 22 shows a perspective view of another embodiment of a cradle portion 12A having two rollers 22, 24, rather than the three shown in other embodiments. The two-roller configuration may be used, for example, in connection with the cylinders 70A to actuate the lift portion 50, as shown in FIGS. 19-21.

Figure 23:
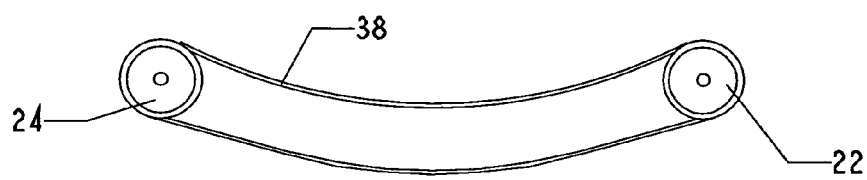
FIG. 23 shows an end view of the cradle portion shown in FIG. 22.

FIG. 23 shows an end view of the cradle portion 12A shown in FIG. 22.

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. A bale processing apparatus comprising:
   a plurality of belts positioned laterally relative to each other and having spaces therebetween, wherein the plurality of belts are sufficient to hold a round bale of hay thereon;
   first and second rollers positioned proximate the plurality of belts, wherein the plurality of belts pass around the rollers;
   means for rotating the plurality of belts while the bale is positioned thereon; and
   means for tensioning the plurality of belts in first and second positions, wherein the first position permits the plurality of belts to form a cradle between the first and second rollers to restrain the bale while the plurality of belts rotate the bale without ejecting the bale from the apparatus and without otherwise supporting the bale in the cradle, thereby unrolling the bale and ejecting a portion of the bale from the cradle as the bale rotates, and wherein the second position permits the plurality of belts to become sufficiently taut to eject the bale laterally from the apparatus.

2. The apparatus of claim 1, wherein the first and second rollers are separated by an adjustable distance, and wherein the means for tensioning comprises adjusting the distance between the first and second rollers.

3. The apparatus of claim 2, wherein the means for tensioning further comprises a motor that controls the distance between the first and second rollers.

4. The apparatus of claim 1, further comprising a motor that controls movement of the plurality of belts.

5. The apparatus of claim 1, further comprising a hay lifting portion abutting and pivotally connected to a rear of the plurality of belts, wherein the hay lifting portion engages a round hay bale, lifts the bale in an upward arc into a position above the plurality of belts, and positions the bale on the belts.

6. The apparatus of claim 5, wherein the hay lifting portion further comprises a bale spear that engages a round hay bale positioned on a ground surface by stabbing the bale along a central axis of the bale.

7. The apparatus of claim 6, wherein the bale spear releasably pivots relative to the hay lifting portion to disengage the bale, when the bale is lifted into a position above the plurality of belts.

8. The apparatus of claim 1, wherein the apparatus is connected to a vehicle, such that when the plurality of belts are in the first position, the ejected portion of the bale is discharged from the cradle in a transverse direction from the vehicle's movement as the vehicle moves.

9. The apparatus of claim 1, further comprising means for connecting the apparatus to a vehicle.

10. A bale processing apparatus comprising:
a plurality of belts positioned laterally relative to each other and having spaces therebetween, wherein the plurality of belts are sufficient to hold a round bale of hay thereon;
first and second rollers positioned proximate the plurality of belts, wherein the plurality of belts pass around the rollers;
means for rotating the plurality of belts while the bale is positioned thereon;
means for tensioning the plurality of belts in first and second positions, wherein the first position permits the plurality of belts to form a cradle between the first and second rollers to restrain the bale while the plurality of belts rotate the bale without ejecting the bale from the apparatus and without otherwise supporting the bale in the cradle, thereby unrolling the bale and ejecting a portion of the bale from the cradle as the bale rotates, and wherein the second position permits the plurality of belts to become sufficiently taut to eject the bale laterally from the apparatus; and
a hay lifting portion abutting and pivotally connected to the rear of the apparatus, wherein the hay lifting portion engages the bale, lifts the bale in an upward arc into a position above the plurality of belts, and positions the bale on the belts.

11. The apparatus of claim 10, wherein the first and second rollers are separated by an adjustable distance, and wherein the means for tensioning comprises adjusting the distance between the first and second rollers.

12. The apparatus of claim 11, wherein the means for tensioning further comprises a motor that controls the distance between the first and second rollers.

13. The apparatus of claim 10, further comprising a motor that controls movement of the plurality of belts.

14. The apparatus of claim 10, wherein the hay lifting portion further comprises a bale spear that engages a round hay bale positioned on a ground surface by stabbing the bale along a central axis of the bale.

15. The apparatus of claim 14, wherein the bale spear releasably pivots relative to the hay lifting portion to disengage the bale, when the bale is lifted into a position above the plurality of belts.

16. The apparatus of claim 10, wherein the apparatus is connected to a vehicle, such that when the plurality of belts are in the first position, the ejected portion of the bale is discharged from the cradle in a transverse direction from the vehicle's movement as the vehicle moves.

17. The apparatus of claim 10, further comprising means for connecting the apparatus to a vehicle.

18. A bale processing apparatus comprising:
a plurality of belts positioned laterally relative to each other and having spaces therebetween, wherein the plurality of belts are sufficient to hold a round bale of hay thereon;
first and second rollers separated by an adjustable distance, wherein the first and second rollers are positioned proximate the plurality of belts such that the plurality of belts pass around the rollers;
a motor for rotating the plurality of belts while the bale is positioned thereon;
at least one actuator for adjusting the adjustable distance between first and second positions, wherein the first position permits the plurality of belts to form a cradle between the first and second rollers to restrain the bale while the plurality of belts rotate the bale without ejecting the bale from the apparatus and without otherwise supporting the bale in the cradle, thereby unrolling the bale and ejecting a portion of the bale from the cradle as the bale rotates, and wherein the second position permits the plurality of belts to become sufficiently taut to eject the bale laterally from the apparatus;
a hay lifting portion abutting the rear of the plurality of belts, wherein the hay lifting portion comprises a bale spear that engages a round hay bale positioned on a ground surface by stabbing the bale along a central axis of the bale and lifting it in an upward arc into a position above the plurality of belts, wherein the bale spear releasably pivots relative to the hay lifting portion to disengage the bale when the bale is lifted into a position above the plurality of belts; and
a vehicle connected to the first and second rollers, such that when the plurality of belts are in the first position, the ejected portion of the bale is discharged from the cradle in a transverse direction from the vehicle's movement as the vehicle moves.

* * * * *